Aug. 25, 1959  A. M. THOMPSON  2,901,199
PIPE CLAMP
Filed May 15, 1956

INVENTOR:
Arthur M. Thompson
BY
Eberhard E. Walley
Atty.

United States Patent Office

2,901,199
Patented Aug. 25, 1959

2,901,199

PIPE CLAMP

Arthur M. Thompson, Chicago, Ill.

Application May 15, 1956, Serial No. 585,074

11 Claims. (Cl. 248—72)

This invention relates to a fastening device of the character that may be generally employed to secure pipes and conduits or the like to flanged members or units that usually constitute parts of a building structure or the like.

More specifically, the invention is directed to a clamp adapted for securing electrical conduits to flanges of structural members such as angle irons, I-beams, H-beams, Z-beams or to analogous articles having suitable flanges or ledges thereon that can be looked to for supporting tubular or other elongated elements which can be held in place by such a clamp.

One of the objects of the present invention is to provide a rugged and sturdy clamp having multiple screw fastenings that are readily adjusted to apply the clamp over a conduit and to secure such conduit to a flanged member through a three point anchorage arrangement.

Another object of the invention is to provide a clamp of the character set forth wherein the fastening means cooperate with the clamp per se to permit the use of the clamp with conduits of different diameters.

As another object, the clamp provides a sturdy angular body with legs to straddle the opposite sides of a flange or ledge member and incorporating at least a pair of fastening units, one associated with each leg of the clamp to provide opposed fastenings situated to either side of the flange member.

A further object is to arrange the screw fastening means of the clamp in predetermined angular positions with respect to the adjacent body portions of the clamp and in predetermined relations with respect to each other to direct a portion of the clamp against a conduit to clamp it to a flanged conduit support and to also secure the clamp to said support while preventing loosening of the clamp by vibration or accident.

As a further object, the fastening means of the clamp are offset and arranged to provide both an adjustable abutment on said clamp and a fastening unit working in coordination to guide the clamp over a conduit and to hold it in that relation while fastening the clamp and at the same time using the abutment as an insurance means to prevent loosening of the clamp from the flange or withdrawal therefrom while the securing operation is being performed.

Other objects and advantages will hereinafter become apparent from the following detailed description having reference to the accompanying drawing forming a part of this specification.

Figure 1:
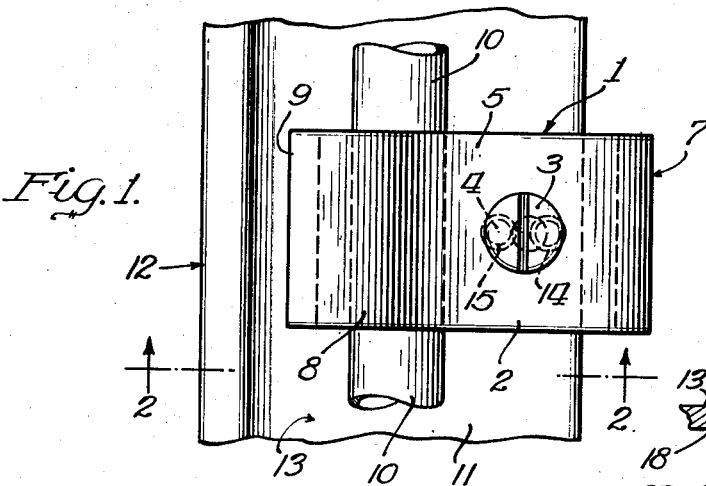
Fig. 1 is a plan view of a pipe clamp constructed according to the concept of the present invention and shown as attached to a beam flange for operatively holding a conduit in place upon such a flange.
Figure 2:
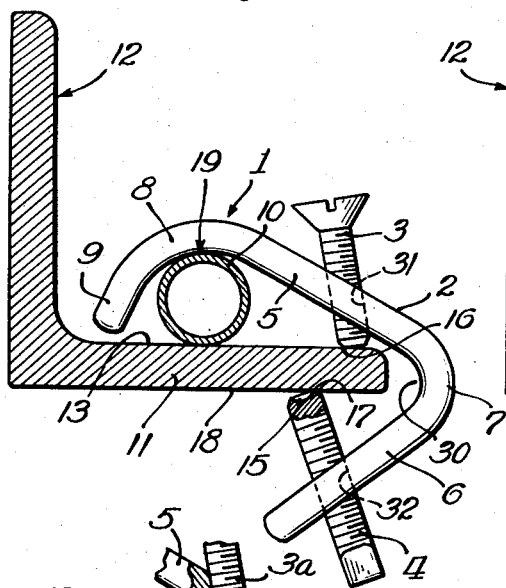
Fig. 2 is a transverse cross sectional view of the beam taken substantially along the plane of the line 2—2 in Fig. 1 to better illustrate the clamp per se.

Referring to Figs. 1 and 2, the clamp unit is indicated in its entirety by the reference numeral 1 and comprises as its principal elements clamp 2 and fastening means consisting of the screws 3 and 4.

The clamp 2 is constructed from substantially rigid flat bar stock cut to length and formed into the shape shown in Figs. 1 and 2 of the drawing. Clamp 2 has its various sections or body portions arranged to form legs 5 and 6 disposed at an acute angle with respect to each other and connected by a sharply curved arcuate section 7. Both legs 5 and 6 are preferably straight with leg 5 the longer of the two, and leg 5 continues into a contiguously formed hook 8 having a short straight terminal tip 9.

The clamp unit 1 is shown in Figs. 1 and 2 as holding or clamping a conduit 10 to the horizontal flange 11 of a structural beam 12, which in this instance consists of an angle iron. In securing the clamp unit 1, screw 3 is adjusted to provide an abutment means on the clamp 2 and more specifically upon leg 5 of the clamp 2 which affords a reactionary means to engage the upper face 13 of flange 11. By adjustment of screw 3 to place the hook 8 over the conduit 10 with clearance between tip 9 and the upper face 13 of flange 11, screw 4 can then be drawn up to cause bodily rotation or tightening of the clamp 2 in a counterclockwise manner against conduit 10 pressing the latter against surface 13 of flange 11, with screw 3 acting as the fulcrum or rocking member for the clamp.

Both screws 3 and 4 are preferably made from hardened steel stock and each has a cupped type end as at 14 and 15 respectively, to bite into the metal of the flange 11 as at 16 and 17 to provide for a better grip of the flange metal to increase the holding power of the clamp.

The clamp construction further provides the first screw 3 positioned at an acute angle with respect to the clamp leg 5 and the second screw 4 positioned at an acute angle with respect to clamp leg 6, both screws 3 and 4 likewise occupying predetermined acute angles with respect to the opposite faces 13 and 18 of flange 11 of the beam 12.

While screws 3 and 4 are so angled in relation to the adjacent clamp parts and flange member, the screws are also offset lengthwise of the clamp to establish staggered reactionary points that are coincident with the points 16 and 17 where the cups 14 and 15 bite into the flange face metal. Thus any upward force at the conduit location under hook 8 through repeated expansion and contraction or through the inherent reactionary stress developed at the conduit contact point as at 19 in Fig. 2 tending to induce a clockwise rotation of the clamp in both instances will be directly counteracted or opposed by the screws 3 and 4 at the offset or spaced reactionary points 16 and 17. Obviously, any counterclockwise motion or movement of the clamp 2 is prevented and counteracted by the reaction of the conduit 10 against the surface of flange 11 and as transmitted through the body of the conduit to the hook 8 of the clamp 2.

Figure 3:
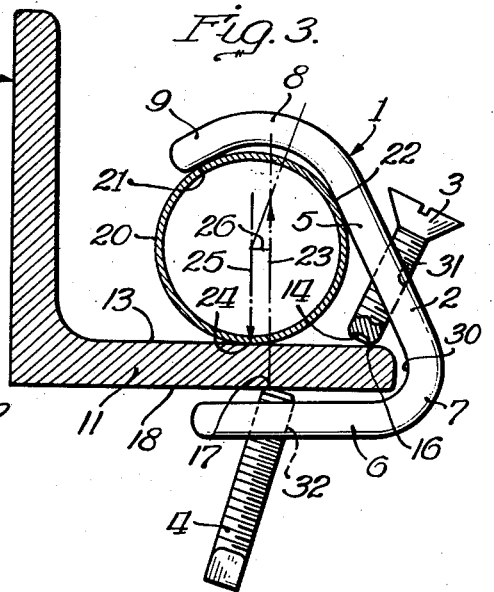
Fig. 3 is an identical cross sectional view like Fig. 2, but illustrating the clamp as supporting a different size of conduit upon the beam flange.

Conduit 10 in Fig. 2 represents a smaller fastenable unit and may be considered a fluid pipe or a soft wall electrical conduit. In Fig. 3, the conduit 20 is of a much greater size with hook 8 providing a stabilizing two point engagement at 21 and 22. Here screw 3 is adjusted more deeply into and through leg 5 of clamp 2 to provide a more extended abutment arrangement and fulcrum point as at 16 in Fig. 3. Drawing up on screw 4 again swings clamp 2 counterclockwise to cause hook 8 to tightly engage the conduit 20 and to press the latter down and against the upper surface 13 of flange 11.

In Fig. 3, the screw 4 reaction point 17 acts generally in the direction of the dash and dot line 23 which is only slightly removed from the reaction point 24 of the conduit 20 that acts generally along the dash and dot line 25. Only a small distance such as 26 separates the reaction lines with the use of the clamp in securing the larger conduits. Drawing up on screw 4 in Fig. 3 pulls hook 8 downward and conduit 20 against the flange face 13 with reaction points 17 and 24 almost vertically in line. The general force of the clamp 2 and conduit is bodily downwardly since the screw 4 acts against face 18 of flange 11 between spaced points 16 and 24 to provide a three point stabilization of the clamp upon the beam and including the encircled and confined conduit member. Actually the clamp provides the three point feature by means of the hook 8 and the two offset screws, with the hook acting through the entrapped or secured conduit and against the flange.

Figure 4:
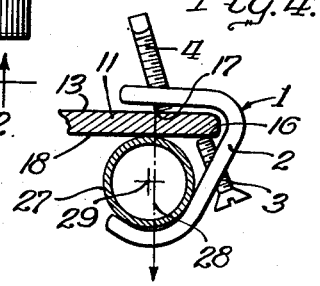
Fig. 4 shows a clamp employed to hold a conduit in suspended relation beneath a beam flange.

A similar situation is encountered in Fig. 4 wherein a conduit 27 such as a heavier water line is suspended below the flange 11. Here the weight of the pipe line and/or its contents act or tend to revolve the clamp 1 in a counterclockwise direction which is directly opposed by the offset screws 3 and 4. The reaction point 17 acts along a line 28 that very nearly intersects the axial center point 29 of the conduit 27. This arrangement creates a pendulum suspension situation with the conduit 27 practically hanging from the fastening portion or point 17 of the screw 4 of clamp 2 as illustrated in Fig. 4.

Figure 5:
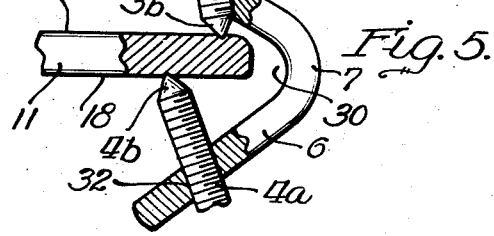
Fig. 5 is a fragmentary cross sectional view of a similar clamp unit with certain apparent modifications in the construction thereof.

Fig. 5 shows a modified arrangement wherein screws 3a and 4a are each constructed with conical terminal tips 3b and 4b for more concentrated metal penetration at the opposite surfaces 13 and 18 of the flange 11. This type of screw end will better counteract any possible displacement of the clamp longitudinally of the beam 12 under certain conditions of use. It is also conceivable that more than one of either or both of the fastening screws might be used in a common transverse plane across the width of the clamp 2 without departure from the general concept of the present invention. Such an arrangement would prevent possible lateral rocking of the clamp. However, for all intents and purposes, the wide flat bar section of the clamp stock provides a good stabilized and seated engagement for the hook 8 upon the top longitudinal surface portion of the conduit which will normally keep the clamp from rocking laterally.

The sharp V-bend 7 also provides an acute recess 30 to face the outer edge of the beam flange and which can be arranged in close proximity to the flange as in Fig. 3. This places the wide face portion of the clamp in a beam flanking position to further counteract possible rocking or turning of the clamp upon its fastenings by flange contact. The clamp 2 of Fig. 2 will also permit further movement inwardly of the flange if desired since clearance is obviously available.

The clamp 2 stock is heavy and wide as explained to provide a rigid unit and to counteract lateral weakness at the screw hole areas. While the clamp stock is substantially rigid, a certain amount of spring is inherent in the clamp stock metal so that the legs 5 and 6 are actually spread apart under the reactionary screw pressures as they act against the beam flange. This leg spread is of sufficient extent to cause automatic binding of the threads of the screws 3 and 4 in their respective threaded sockets 31 and 32 in legs 5 and 6 respectively which action locks the screws in their adjusted positions.

One other feature of the clamp is the selection of the spread angle of legs 5 and 6 as shown which does permit the use of a clamp of this character upon flanges that vary in size, as for example, between one-eighth inch in thickness to three-quarters of an inch in thickness.

All of the attributes described in relation to the simple and easily applied pipe clamp collectively point directly to the extreme versatility and efficiency of the device of this invention as exemplified in the drawings.

The foregoing description has been directed to certain preferred forms of the invention. There are other variations possible and contemplated in the exact construction of the individual elements and in the combinations thereof to constitute the clamp unit of the present invention. Any other modifications shall, however, be governed by the breadth and scope of the language defining the invention in the appended claim or claims.

What I claim is:

1. A fastening device to secure a conduit member to a flange comprising a clamp defined by a pair of connected and acutely positioned legs providing opposing face portions diverging outwardly away from the acute leg angle connection to assume a position to angularly flank opposite sides of the flange, and one of said legs having an inturned hook end projecting into the acute leg space therebetween to engage over said conduit member, said legs straddling said flange, and screw means connected with each of said legs respectively, said screw means being angularly positioned with respect to their associated legs and with respect to each other and adapted for engaging opposite sides of said flange.

2. A fastening device of the character set forth and defined in claim 1, and wherein said point of contact of said hook end with said conduit member and the points of engagement of the screw means with said flange are all spaced apart in the longitudinal direction of said clamp.

3. A fastening device of the character set forth and defined in claim 1, and wherein the point of engagement of one of the screw means with said flange is disposed intermediate the point of contact of the hook end with said conduit member and the point of engagement of said other screw means with said flange.

4. A fastening device of the character set forth and defined in claim 1, wherein said screw means consist of a pair of screws arranged with their longitudinal axes disposed in offset relation with respect to each other, both of said screw axes being offset with respect to said hook end with said screws engaging opposite faces of the flange and positioned so as to counteract rotation of the hook end away from said conduit member and out of clamping engagement therewith.

5. A fastening device to secure a conduit to the flange of a structural unit comprising a wide faced clamp to engage an extended longitudinal portion of said conduit and to hold said conduit against said flange, said clamp having a pair of connected legs angularly positioned with respect to each other to receive the flange edge therebetween, and screws connected with each of said angularly arranged legs to engage opposite surface portions of said flange in angular relation with respect to said flange, one of said screws providing an adjustable abutment member for bodily fulcruming said clamp upon said flange, and said other screw providing means to rotate said clamp upon said adjustable abutment member and into contact with said conduit to urge the latter toward a surface portion of said flange to secure said conduit thereagainst.

6. A fastening device to secure a conduit to a flange of a structural unit comprising a V-shaped clamp provided with a wide mouth divergent open end to straddle the outer free edge of said flange and to extend inwardly from said edge adjacent opposite faces thereof to permit a wide range angular adjustment of said clamp in respect to said recipient flange, a hook on one outer end of said clamp to engage over the conduit, and cooperative inwardly directed screw members on the legs of said V-clamp to contact opposite outwardly disposed faces of the flange, one of said screw members being positioned along an axis located toward the outer open end of said V-clamp and inwardly with respect to the hook on said one clamp end, the other of said screw members occupying a position along an axis located inwardly of the clamp in relation to the first screw member location whereby said members engage said flange faces at different inwardly spaced positions with respect to the hook end of the clamp, one of said screw members providing a fulcrum for said clamp and the other screw member providing means to rotate said clamp hook against said conduit to urge the latter against said flange.

7. In a fastening device of the character set forth and defined in claim 6, wherein said screw members are angularly carried by their respective legs of the V-clamp and said flange, said screw members being provided with sharp end portions adapted to bite into the contacted surface portions of said flange to hold the screw members in their respective engaged positions as fulcrum and rotating means.

8. A fastening device to secure a conduit to a flange comprising a body formed by a pair of connected legs defining a securing end arranged to straddle one edge portion of the flange, one of said legs having a curved section to engage over a conduit disposed inwardly of the edge of the flange and along one face of said flange, and edgewise movable coacting means connected with each of said legs respectively and adapted to engage opposite outwardly disposed faces of said flange, edgewise adjustment of said coacting means functioning to rock said body relatively to said flange in a direction to cause said curved section to urge said conduit tightly against said one adjacent flange face.

9. In a fastening device as set forth and defined in claim 8, wherein said coacting means each consist of at least one screw member adjustably threaded through each of said legs respectively, the screw member connected with the leg having said curved conduit engaging section being disposed for engagement with the flange face at the conduit side thereof and in a position intermediate the conduit location and the edge of the flange, and said other screw member being connected with said other leg and arranged to adjustably engage the opposite flange face at a point intermediate the positions of said conduit and flange contact of said other screw member.

10. In a fastening device as set forth and defined in claim 8 and wherein said curved section presents a wide face in the width thereof to contact the conduit along a given length thereof, and said curved section being formed with a predetermined radius of curvature to bring about a single line contact with conduits of smaller proportions and to bring about double line contact with conduits of larger proportions.

11. A fastening device to secure a conduit to a flange comprising a wide flat strap iron body having a pair of connected straight flat legs defining a wide mouth end arranged to straddle and to receive the flange therein, said legs being acutely arranged in outwardly divergent relationship to provide a sharp recess therebetween at their junction for disposition adjacent the outer free edge of the flange to bring this portion of the clamp body substantially parallel to the flange, and said divergent legs providing a wide latitude clearance condition to facilitate rocking of the body relatively to the opposite outward faces of the flange and to thereby accommodate various diameter sizes of conduits, one of said legs having a conduit engaging tip formed to arc out of the general plane of said one leg and curving in the direction of said other leg, and coacting means connected with each of said legs respectively and adapted for adjustable securing engagement with opposite outward faces of said flange, said coacting means functioning to rock said body by reason of its divergent legs relatively to said flange in a direction to urge said conduit engaging tip into engagement with the conduit and to press said conduit tightly against said flange, said leg tip providing a wide bearing surface disposed within the confines of the wide mouth zone of said body to contact said conduit upon an extended portion thereof in substantial parallelism with respect to the sharp recess portion of the leg juncture at said flange edge.

References Cited in the file of this patent

UNITED STATES PATENTS

| | | |
|---|---|---|
| 339,072 | Nies | Mar. 30, 1886 |
| 1,063,566 | McFeaters | June 3, 1913 |
| 1,224,309 | Lupke | May 1, 1917 |
| 2,163,635 | Shea | June 27, 1939 |